Aug. 22, 1933.  J. R. LITTY ET AL  1,923,871
CAKE CUTTING MACHINE
Filed Oct. 2, 1930   3 Sheets-Sheet 1
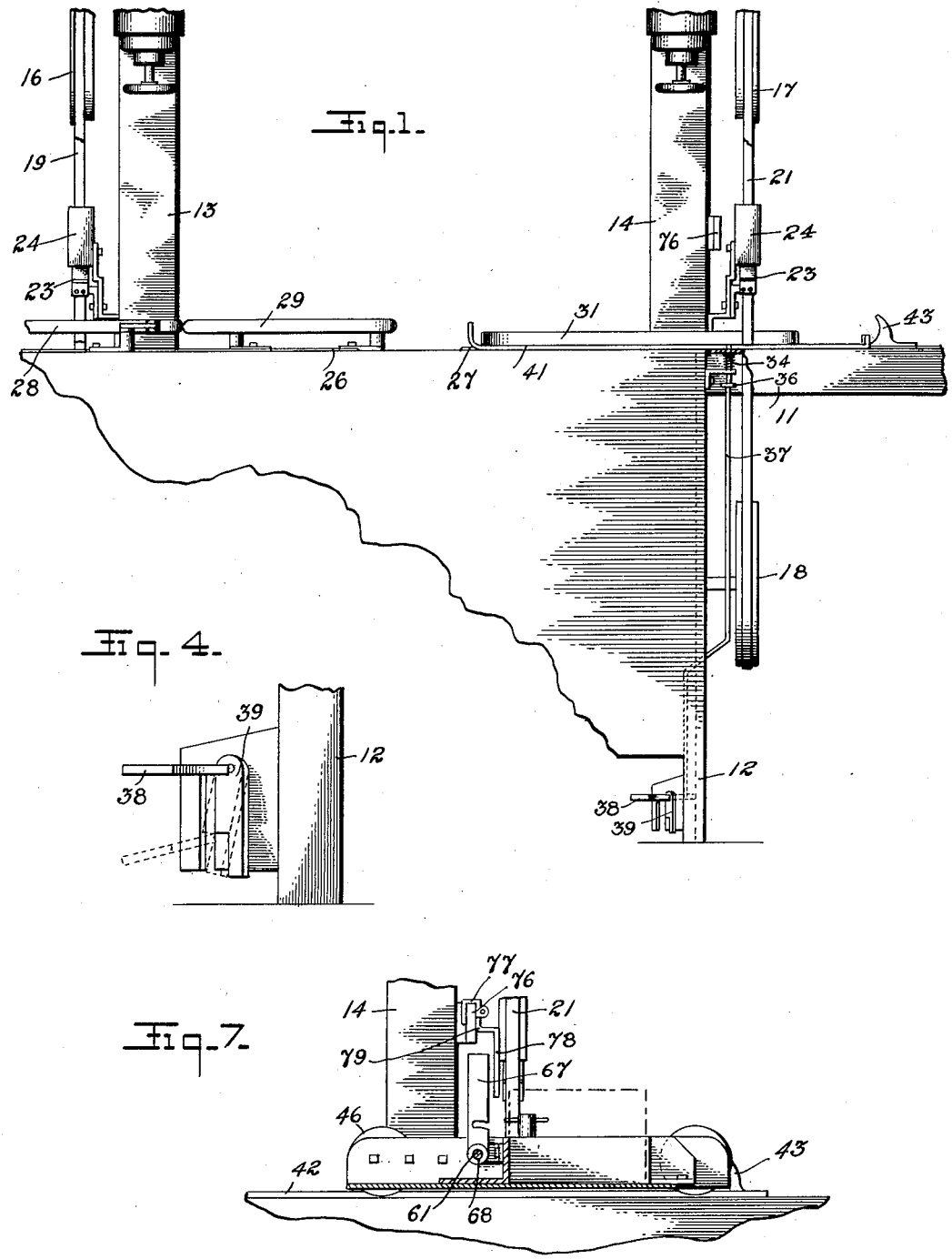
WITNESSES
INVENTORS
John R. Litty
Trued B. Lundin
BY
THEIR ATTORNEY

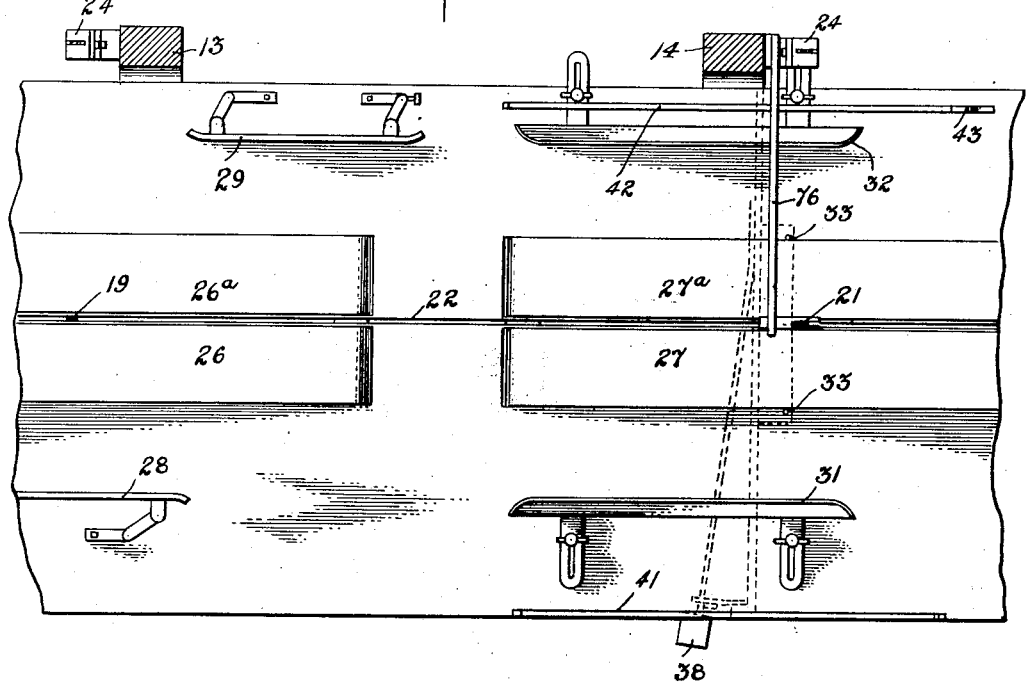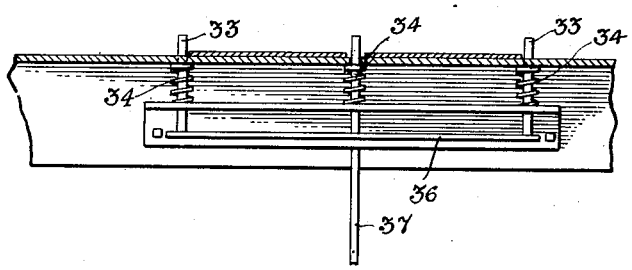

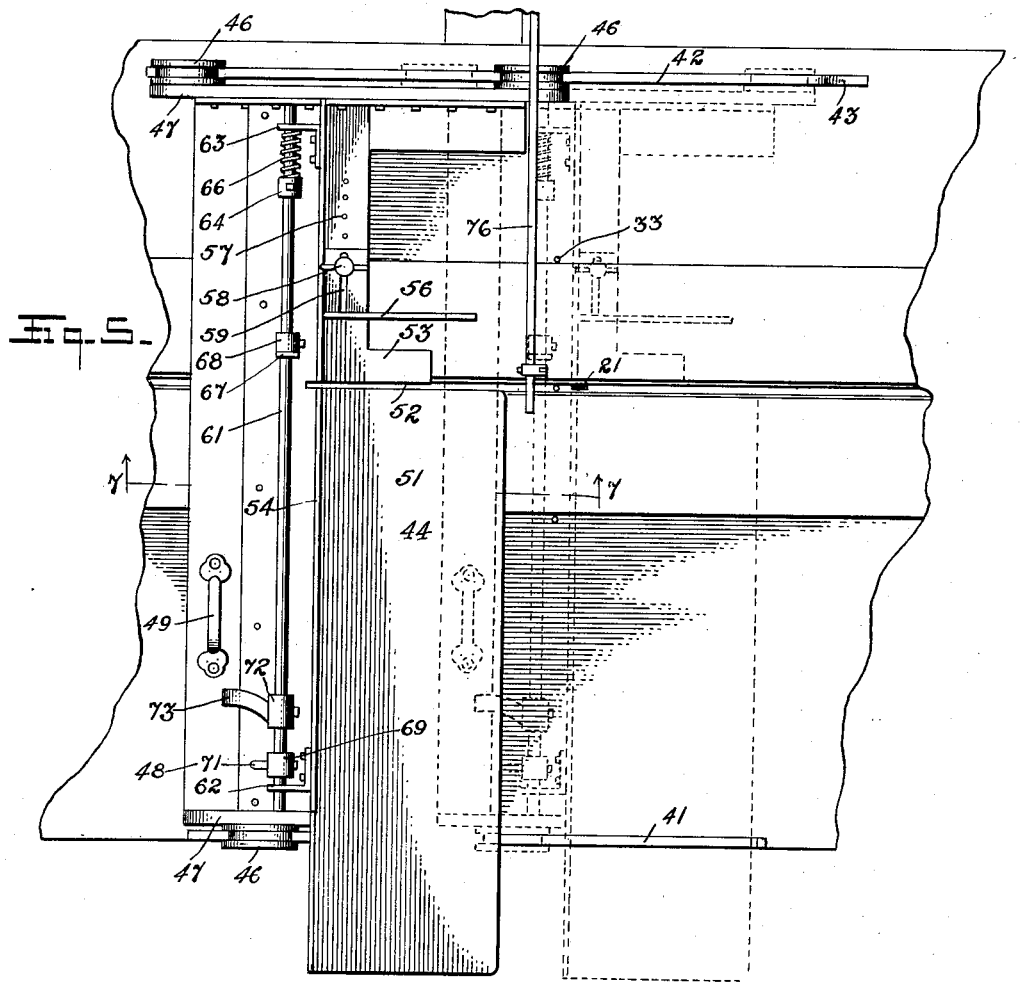

Patented Aug. 22, 1933

1,923,871

UNITED STATES PATENT OFFICE 1,923,871

CAKE CUTTING MACHINE

John R. Litty and Trued B. Lundin, Philadelphia, Pa., said Lundin assignor to Elizabeth H. Litty, Philadelphia, Pa.

Application October 2, 1930. Serial No. 485,874

13 Claims. (Cl. 146—88)

This invention relates to a cake cutting machine of the particular type capable of cutting large cakes or slabs of cake into a number of small cakes, and of cutting jelly rolls and the like into small slices.

The invention embodied in this application is an improvement on the cake cutting machine shown and described in United States Letters Patent No. 1,494,774, granted May 20, 1924, to Eugene H. Davis.

As stated in the above cited patent, present day cake bakeries have built up a large business selling small rectangularly cut cakes, as well as jelly roll and fruit and other cake slices for household, lunch and picnic use.

It is much more economical to bake large cakes or slabs of cake and then cut the same into the required sizes than it would be to separately bake each small cake individually.

The present invention has for its main object the provision of a greatly improved cake cutting machine.

Another object is to provide novel means for squarely aligning the cake before the same reaches the cutting knife.

A further object is to provide novel cake slicing apparatus which insures uniformity of size in the cut slices.

Still another object of the invention is to provide means whereby the cake may be quickly and conveniently trimmed prior to slicing.

According to the invention the machine comprises a table having a pair of belt conveyors passing over the same and between which there are located band knives for cutting the cake as desired, the first of said band knives being for the purpose of cutting the cake centrally, and the second knife being for the purpose of cutting the cake transversely, means cooperating with said second knife and comprising a reciprocable table upon which the centrally cut cake is placed, and which is provided with a limiting plate for positioning the cake with respect to the knife, and means for transferring the cut slice of cake from the reciprocable table to the conveyor when the said table is pushed away from said knife.

The machine is also provided with cake squaring pins which may be manually withdrawn from operative position and which may be held in said inoperative position when the reciprocable table is in use.

The drawings illustrate an embodiment of the invention and the views therein are as follows:

Figure 1 is a fragmentary front elevation of the machine,

Figure 2 is a fragmentary plan,

Figure 3 is a fragmentary view showing the manner in which the cake squaring pins operate, Figure 4 is an enlarged view of the foot treadle for operating the cake squaring pins and for holding the same out of operative position when the reciprocable table is used, Figure 5 is an enlarged fragmentary plan view of the right hand portion of the table shown in Figure 2, and with the reciprocable table shown in its initial position thereon, and with its extreme position shown in dotted lines, Figure 6 is a front end view of the reciprocable table in its initial position on the main table, which is fragmentarily shown, and Figure 7 is a vertical sectional view on the line 7—7 of Figure 5 and shows the reciprocable table in its extreme position.

For the sake of simplicity, and since the invention is an improvement on the well-known type of cake cutting machine shown in the above patent, only such parts of the machine as are necessary for a proper understanding of the invention have been illustrated.

The table 11 is supported on legs 12 and is provided with upright standards 13 and 14 at the rear thereof, as shown in Figure 2.

These standards support band wheels 16 and 17, respectively, while aligned with these wheels are band wheels 18, one of which is shown in Figure 1 of the drawings.

These band wheels 16 and 17 are, respectively, provided with band knives 19 and 21, which said knives, on their downward travel, pass through a longitudinal slot 22 extending through the said main table.

Secured to the standards 13 and 14 are knife scraping elements 23 and knife wiping means 24 for keeping the knives clean and smooth at all times.

These elements add to the efficiency of the machine, but form no part of the invention to be hereafter claimed.

The left hand side of the machine is provided with a pair of belt conveyors 26 and 26ª which are identical and which are so arranged as to expose the longitudinal slot 22 in the main table 11 so as to pass the knife 19, while at the same time to engage with said knife any cake which may rest across the passage between the said belts.

The right hand end of the table is also provided with a pair of conveyor belts 27 and 27ª which are identical in width and location with the belts 26 and 26a, and which are adapted to pass the knife 21 so that any cake placed across the opening between said belts will be engaged by said knife and severed.

The machine is provided with suitable cake guide rails 28 and 29 which may be adjusted to and from the belts 26 and 26a, and is also provided with suitable cake guide rails 31 and 32 for positioning the cake with respect to the belts 27 and 27a.

These latter rails 31 and 32 are readily removable from the table 11 when the reciprocable table (hereinafter explained) is used.

Immediately in front of the band knife 21 and arranged in a line at right angles to the longitudinal slot 22 are a series of cake squaring pins 33, the center pin operating through the said longitudinal slot 22 and the outer pins operating beyond the outer sides of the belts 27 and 27a.

These pins normally extend above the surface of the belts 27 and 27a and when a cake or cakes are being conveyed by the said belts toward the knife 21, will stop the said cake and they, together with the action of the said moving belts, will square the cake on the belt readily for cutting.

The pins are urged upward by means of springs 34 and are all mounted on a cross bar 36 which is engaged by a rod 37 which has its lower end connected to the foot treadle 38, so that pressure on the said treadle will withdraw the pins from above the said table and from the position shown in Figure 3, whereupon the cake or cakes may be conveyed by the belts 27 and 27a against the band knife 21 and severed.

The squaring pins 33 may be retained in their lowered position by pressing the treadle 38 downward and throwing the latch member 39 into the position shown in dotted lines in Figure 4.

The machine as illustrated in Figures 1 and 2 is operated in the following manner:

A large slab of cake is placed on the conveyor belts 26 and 26a to the left of the band knife 19 after the guide rails 28 and 29 have been adjusted and the cake so placed is moved by the belts toward the band knife 19 and severed centrally and delivered on that portion of the table between the said conveyor belts and the conveyor belts 27 and 27a.

The guide rails 31 and 32 having been adjusted, the cake is then turned by hand 90° and moved onto the conveyor belts 27 and 27a which feed the same through the band knife 21, thereby severing the same transversely.

In the baking of cakes the outer ends are usually smaller than the body of the cake and it is inadvisable to use this portion of the cake for slices which are intended to be of uniform size and weight.

On either side of the table 11 and opposite the conveyor belts 27 and 27a there is a track 41 and 42. The track 41 has its ends upturned, while the track 42 has its left hand end upturned and at its right hand there is located a stop member 43.

It has been before stated that when the reciprocable table is used that the cake squaring pins 33 are withdrawn from above the surface of the conveyor belts 27 and 27a so as to permit of the reciprocable table being moved backward and forward on the tracks 41 and 42.

The reciprocable table, generally designated by the numeral 44, is provided with three wheels 46 journaled in side rails 47 of the frame 48. At the left hand side of the same there is provided a hand grip 49 for pushing the table back and forth on the tracks 41 and 42.

The cake supporting plate 51 extends out beyond the front of the machine and its rear end is slightly in front of the band knife 21, while a slot 52 is provided between the rear of said supporting plate 51 and the auxiliary plate 53 to permit the passage of the band knife 21 when the said reciprocable table is moved to its extreme right hand position.

The table is provided with a side wall 54 which extends from end to end of the same and a slice regulating plate 56 is adjustably mounted on the auxiliary plate 53 through the medium of the holes 57, screw 58, and slot 59.

To the left of the side wall 54 there is mounted a shaft 61 which is journaled in the brackets 62 and 63, and the shaft is provided with a collar 64, between which said collar and the brackets 62 there is provided a helical spring 66 surrounding the said shaft and having its ends fixed in said collar and brackets so as to at all times urge said shaft in a counter-clockwise direction.

At a point in line with the space between the rear end of the plate 51 and the slice regulating plate 56 there is provided on the shaft 61 a trim plate 67 which is mounted on a collar 68 secured to the said shaft.

At the forward end of said shaft there is another collar 69 which has a limiting finger 71 for limiting the counter-clockwise movement of the shaft 61 through the spring 66, while beyond the said limiting finger the shaft is provided with a collar 72 having thereon a thumb operating member 73 for rotating the shaft in a clockwise direction.

When the shaft is in its normal position with the limiting finger 71 resting on the frame 48, the trim plate 67 will be vertically disposed, as shown in Figure 6, and when the shaft is rotated by raising the thumb operating member 73 so as to move the shaft in a clockwise direction, the trim plate will revolve 90° and the arcuate slot 74 will permit the said plate passing over the side wall 54 and providing a stop for any cake slid along the plate 51.

Extending out from the standard 14 is a supporting bar 76 to which there is secured a bracket 77, and to this bracket there is pivotally fastened a slice transferring finger 78.

This finger 78 is offset so as to provide a shoulder 79 which engages the side of the supporting bar 76 when the finger is in a vertical position, and prevents the same from being swung to the left of said vertical position, but the said finger may be engaged by a slice of cake and swung as far to the right hand side as is necessary to permit the slice of cake to pass under the same.

The operation and utility of the reciprocable table 44 is as follows:

Presuming that an oblong cake has been cut centrally by the knife 19, the same is transferred onto the cake supporting plate 51 which is in its left hand position. The operator will then grasp the thumb member 73, bring the trim plate 67 into horizontal position, and will then push the cake against this trim plate, and while still holding the thumb member 73, will grasp the hand grip 49 and move the table to the right, whereupon the slice transferring finger 78 will ride along that portion of the cake between the band knife 21 and the trim plate 67. As the cake engages the knife 21, the end thereof will be severed, and since the supporting bar 76 is in front of the knife 21, the finger 78 will fall behind the sliced cake when the slice is fully severed. As the reciprocable table is returned to its initial position, the finger 78 will push the slice of cake from the auxiliary plate 53 onto the belt conveyor 27a where it will be conveyed to the right hand end of the machine.

The cake being thus trimmed, the operator will release the thumb member 73 and will thereafter continue to push the cake up against the slice regulating plate 56 (which, of course, has been formerly adjusted to provide the proper thickness of a slice) and the table will again be moved to the right and the slices cut and transferred in the same manner as was the trimmed slice.

This operation will continue until the cake has been fully sliced and each slice except the trim slice will be uniform in size and weight, with the possible exception of the last slice.

The cake cutting machine illustrated may be modified and changed in various ways without departing from the invention herein set forth and hereafter claimed.

The invention is hereby claimed as follows:

1. A cake cutting machine comprising a main table, a cutting knife, a flexible strip conveyor operating at one side of the knife, a reciprocable slotted table for carrying a cake, said cutting knife operating in said slot of the table and severing a slice from the main body of the cake, said slice after severance remaining on said table, and means for sliding the cake slices from said reciprocable table to said conveyor.

2. A cake cutting machine comprising a main table, a cutting knife, a flexible belt conveyor operating at one side of said knife, tracks on said table, a reciprocable slotted table movable on said tracks for carrying a cake, said cutting knife operating in said slot of the table and severing a slice from the main body of the cake, said slice after severance remaining on said table, and means for sliding the severed portions of cake from the reciprocating table to the conveyor.

3. A cake cutting machine comprising a cutting knife, a horizontally moving conveyor at the side thereof, and a manually reciprocable table for carrying a cake, said cutting knife operating in said slot of the table and severing a slice from the main body of the cake, said slice after severance remaining on said table, and a finger pivotally mounted to slide over said slice as the same is being cut, and constructed to fall into a fixed vertical position back of said slice to slide said cut slice from said table onto said conveyor when the table is retracted.

4. In combination with a cake cutting machine comprising a main table, a vertically moving cutting knife and a belt conveyor horizontally movable alongside of said knife, of a slotted table reciprocably mounted on the main table and having a plate for supporting a cake body to be sliced, said knife operating in said slot and severing a slice from the cake body, a plate for regulating the thickness of the slices to be cut, a trim plate mounted on a shaft on said reciprocable table and adapted to be manually moved over the supporting plate for regulating the thickness of a trim slice to be cut from the end of said cake body, and spring means for removing said trim plate from over the supporting table.

5. A cake cutting machine comprising a main table, a vertically movable cutting knife, a flexible strip conveyor horizontally movable alongside of said knife, a slotted reciprocable table for carrying a cake body and adapted to be moved to pass said knife into said slot to sever a slice from said cake body, and a finger mounted on a stationary part of said machine and adapted during the cutting of the slice to slide over the same and during the reverse movement of said reciprocable table to engage the cut slice and hold the same, thereby sliding said slice onto the conveyor.

6. A cake cutting machine comprising a main table, a vertically movable cutting knife, a flexible strip conveyor horizontally movable alongside of said knife, a slotted reciprocable table for carrying a cake body and adapted to be moved to pass said knife into said slot to sever a slice from said cake body, and a finger forwardly swingable to slide over said cake during the forward movement of the reciprocable table, and mounted to engage the cut slice and hold the same when the reciprocable table is retracted, thereby sliding said slice onto the conveyor.

7. A cake cutting machine comprising a vertically disposed cutting knife mounted on a standard, a horizontally movable conveyor alongside of said knife, and a reciprocable slotted table for carrying a cake body to said knife for cutting a slice from same as the knife passes into the slot in said table, and a finger pivotally mounted on said standard to slide over said slice as same is being cut and constructed to fall into a fixed vertical position behind the slice to slide said cut slice from said table onto said conveyor when the table is retracted.

8. In combination with a cake cutting machine having a main table, a vertically movable cutting knife and a horizontally movable belt conveyor alongside of said knife, of a slotted table mounted for reciprocation on the main table and having a plate for supporting a cake body to be sliced, said knife operating in said slot and severing a slice from the cake body, a limiting plate for regulating the thickness of the slices to be cut, and a plate mounted on the reciprocable table and adapted to be manually swung over the supporting plate to act as a limit to the initial movement of the cake body whereby a thin trim slice may be cut from the end of the cake when the cake supporting table is moved toward the knife.

9. In combination with a cake cutting machine having a main table, a vertically movable cutting knife and a horizontally movable belt conveyor alongside of said knife, of a slotted table mounted for reciprocation on the main table and having a plate for supporting a cake body to be sliced, said knife operating in said slot and severing a slice from the cake body, an adjustable limiting plate for regulating the thickness of the slices to be cut, and a plate mounted on the reciprocable table and adapted to be manually swung over the supporting plate to act as a limit to the initial movement of the cake body whereby a thin trim slice may be cut from the end of the cake when the cake supporting table is moved toward the knife.

10. A cake cutting machine having a table, a standard above the same, a cutting knife mounted for vertical movement on said standard, a flexible strip conveyor on said table and moving horizontally at the side of said knife, a reciprocable slotted table for carrying a cake body and mounted for movement to and from said knife, said knife being adapted to enter said slot in the table for severing a slice from said cake body, and a finger mounted on said standard and slidable over the cake slice during severance thereof but adapted during the retraction of the reciprocable table to engage the severed slice of cake to hold same and slide it onto said conveyor.

11. A cake cutting machine having a table, a standard above the same, a cutting knife mounted for vertical movement on said standard, a flexible strip conveyor on said table and mounted for horizontal movement alongside of said knife, a reciprocable slotted table for carrying a cake body and mounted for movement to and from said knife, said knife being adapted to enter said slot for severing a slice from said cake body, and a finger mounted on said standard and adapted to be swingable outward only in order to slide over the cake slice during severance thereof, and adapted during the retraction of said reciprocable table to be held rigid to engage the severed slice of cake to hold the same and slide it onto said conveyor.

12. A reciprocable slotted table for use with a vertically moving knife, comprising a supporting plate on which a cake body is manually moved across the table, said knife operating in said slot and severing a slice from the cake body, means for regulating the thickness of a trim slice to be severed from the end of the cake body, and manually movable into the path of the cake body, said means being spring retractible, and a plate beyond said means and mounted on said supporting plate for defining the thickness of the slice to be cut from the cake body when said means is out of the path of the cake body.

13. A reciprocable slotted table for use with a vertically moving knife, comprising a supporting plate on which a cake body is manually moved across the table, said knife operating in said slot and severing a slice from the cake body, means for regulating the thickness of a trim slice to be severed from the end of the cake body, and manually movable into the path of the cake body, said means being spring retractible, and a plate beyond said means and adjustably mounted on said supporting plate for defining the thickness of the slice to be cut from the cake body when said means is out of the path of the cake body.

JOHN R. LITTY.
T. B. LUNDIN.